United States Patent
Duyfjes et al.

[15] 3,686,419
[45] Aug. 22, 1972

[54] PESTICIDAL COMPOSITION AND METHOD OF PREPARING SAME

[72] Inventors: Werner Duyfjes; Willem Maas, both of Amsterdam, Netherlands

[73] Assignee: North American Philips Co., Inc., New York, N.Y.

[22] Filed: Jan. 21, 1969

[21] Appl. No.: 792,813

[30] Foreign Application Priority Data

Jan. 23, 1968 Netherlands..............6800959
April 5, 1968 Netherlands..............6804903

[52] U.S. Cl..................................................424/356
[51] Int. Cl. ................................................A01n 9/00
[58] Field of Search......................................424/356

[56] References Cited

UNITED STATES PATENTS 2,694,663 11/1954 Stayner......................424/356
2,782,111 2/1957 Bloch et al....................71/2.6
3,244,727 4/1966 Weil..........................260/327

*Primary Examiner*—Albert T. Meyers
*Assistant Examiner*—Frederick E. Waddell
*Attorney*—Frank R. Trifari

[57] ABSTRACT

Alkylated aromatic hydrocarbons of 9–13 carbon atoms in one or more of the alkyl moieties are useful as insect control agents in plant crops.

11 Claims, No Drawings

PESTICIDAL COMPOSITION AND METHOD OF PREPARING SAME

This invention relates to a new and useful pesticidal composition and to methods of employing the composition to combat insects and mites in plant crops.

It is known that aromatic hydrocarbons which comprise one or more alkyl groups which contain a total of 9-13 carbon atoms per molecule are suitable solvents for halogenated aryl oxymonocarboxylic acids or derivatives thereof particularly since these hydrocarbons exert a strengthening action on the herbicidal activity of the said halogenated aryloxymonocarboxylic acids and their derivatives. Particularly alkylated benzenes having 9-13 carbon atoms would be suitable for this purpose (U.S. Pat. Specification No. 2,782,111).

It is also known that certain aromatic and aliphatic hydrocarbons, particularly the so-called tar oils and mineral oils have also been applied as such for the control of eggs of insects of red spider mites in woody crops during the winter season. These solvents have a considerable phytotoxic activity which may principally be ascribed to the aromatic hydrocarbons contained therein so that use during other seasons is a danger to the plant growth.

According to the invention it has unexpectedly been found that, in spite of a complete aromatic character, certain alkyl derivatives of benzenes exhibit little or no phytotoxicity in doses which are required for controlling insects and red spider mites in the sensitive stages of their development.

According to the invention it has been found that alkylated benzenes which are liquid at 20° C and the alkyl portions of which contain 8-15 carbon atoms exhibit little or no phytotoxic activity but possess excellent insecticidal and acaricidal properties. Due to this combination of properties, these liquids are suitable for the control of insects, red spider mites and their stages of development, notably the eggs, during all seasons of the year without the risk of serious damage to the leaves of trees or other plants occurring as a result of the spraying. These liquids are in particular suitable to replace the so-called summer-oils.

In the present application alkylated benzenes are to be under stood to be alkyl derivatives of benzene, toluene, xylene and mesitylene having at least one alkyl group of 8-15 carbon atoms. These alkylated benzenes may be chemically pure compounds but may also be mixtures thereof. Furthermore, the alkyl group may be branched or non-branched.

Examples of alkylated benzenes that may be employed are:
1-phenylnonane,
isododecyl benzene,
6-benzyl-undecane,
2,4-dimethyl 4-benzyldecane,
2,4-dimethyl 4-benzylundecane,
1-phenyl dodecane,
2-phenyl dodecane,
3-phenyl dodecane,
4-phenyl dodecane,
5-phenyl dodecane,
6-phenyl dodecane,
1-phenyl tridecane,
2-phenyl-tridecane,
3-phenyl tridecane,
4-phenyl tridecane,
5-phenyl tridecane,
6-phenyl tridecane,
7-phenyl tridecane,
1-phenyl tetradecane,
2-phenyl tetradecane,
3-phenyl tetradecane,
4-phenyl tetradecane,
5-phenyl tetradecane,
6-phenyl tetradecane,
7-phenyl tetradecane and
1-(3,4-xylyl)-dodecane In a preferred embodiment the benzene is substituted with only one alkyl group of 8-15 carbon atoms and is otherwise unsubstituted.

In a still more preferred embodiment the benzene is substituted only with an alkyl group of 12 carbon atoms. These compounds and those technical mixtures produced in the petrochemical industry in which the main component is a benzene substituted only with an alkyl group of 12 carbon atoms are called hereinafter dodecyl benzene.

Alkylated benzenes are generally products from the petrochemical industry. The alkyl portion is formed by polymerization of propylene or butene. Dependent upon the polymerization process a mixture of more or less branched hydrocarbons of different chain length is produced.

A petrochemical product which is very satisfactory according to the invention is commercially available under the name of "Dobane" PT12. This is an alkyl benzene having a branched side chain and manufactured from propylene tetramer and it consists for more than 70 percent of an alkyl benzene the alkyl group of which contains 12 carbon atoms.

In addition the petrochemical industry supplies a number of mixtures of alkyl benzene compounds which have substantially straight alkyl groups. Of these products which may alternatively be used for the purpose of the invention may be mentioned: "Dobane" 83 (X)(number of carbon atoms side chain $(n) = 8-13$), "Dobane" JN (X) ($n = 10-13$), "Dobane" JN, (B) ($n = 10-13$)and "Dobane" 055 (X)($n = 10-15$).

In tests with eggs of red spiders and of various insects it was found that an excellently ovicidal activity can be obtained both with pure and technical dodecyl benzene. The dosages correspond in broad outline to the paraffine oils which are more or less refined such as have been used up till now for this purpose. Furthermore, it was found that the percentage of survival of the adult red spider and of various kinds of insects is surprisingly small after spraying with dodecyl benzene.

Upon spraying seedlings of tomato, Indian cress, dwarf bean, cotton, cucumber, cabbage and beet in pot experiments with undiluted technical dodecyl benzene (DOBANE PT 12) which was nebulized in quantities which correspond to a dosage of 40 liters/hectare no damage to the leaves of the seedlings was found 2 weeks after nebulizing. In the tests of the seedlings of cucumber it was found that the nebulized technical dodecyl benzene does not spread or spreads slightly on the leaves of the cucumber seedlings.

Dodecyl benzene as such may be used for the application of the invention. It is alternatively possible to use an emulsion of dodecyl benzene and water as a spraying or nebulizing liquid, or a mixture of dodecyl benzene and a non-phytotoxic diluent for dodecyl benzene, for example, refined kerosene.

Two methods may be used for preparing an emulsion of dodecyl benzene and water:

1. The dodecyl benzene is processed to a so-called miscible oil (or emulsifiable concentrate) by means of a non-ionic emulsifier to which an anionic emulsifier may be added, which solution is mixed with water when being used, producing an oil-in-water emulsion;

2. The dodecyl benzene is processed to a so-called flowable paste either by means of annon-ionic, an anionic or a cationic emulsifier or mixtures thereof with water, which paste, or "stock" emulsion is diluted with water when being used.

The non-ionic emulsifier which is suitable for the preparation of the miscible oil is, for example, an alkylphenyl polyglycolether having 8 to 20 moles of ethylene oxide per mol of alkyl phenol, or a polyoxyethylene ether of an aliphatic school having 12 to 20 carbon atoms with the same number of ethylene oxide molecules of a polyoxyethylene compound of a partial ester of a polyalcohol for example, glycerine, and an aliphatic carboxylic acid having 12 to 20 carbon atoms.

For the preparation of the miscible oil of dodecyl benzene these emulsifiers are mixed, if desired, with anionic emulsifiers which are soluble in hydrocarbon oils, for example, amine salts of different alkyl-aryl sulphonic acids such as dodecyl benzene sulphonic acid or the calcium salt thereof, and petroleum sulphonate (mahogany soaps), fatty acid soaps, for example, ammonium oleate or sodium oleate or abietates, for example, colophony. In general usable miscible oils are obtained if a total of approximately 5 percent of the emulsifiers mentioned hereinbefore is added to the dodecyl benzene.

For the preparation of a flowable paste of dodecyl benzene the same substances as those described above for the preparation of the miscible oils as nonionic or ionic emulsifiers may be employed. A tetra-alkyl ammonium halide is suitable as a cationic emulsifier which can be used instead of an anionic emulsifier, for example, the dodecyl trimethyl ammonium chloride compound or an alkyl pyridine chloride, for example, cetyl pyridine chloride.

For the preparation of a flowable paste, for example 75–85 parts by weight of dodecyl benzene are dispersed in 13–23 parts of water to which have been added 1–5 parts by weight of emulsifier consisting of an anionic or a non-ionic emulsifier or a cationic emulsifier or mixtures thereof. If desired the emulsion contains a stabilizer such as a caseinate, carboxymethyl cellulose of hydroxyethyl cellulose.

If desired the biocidal activity of the dodecyl benzene may be increased by the addition of a different pesticide either to the dodecyl benzene phase or to the aqueous phase, for example, in a flowable. Suitable as insecticides are, for example, organo-phosphorus compounds such as parathion, malathion, D.D.V.P., ethione or 0, 0-dimethyl 0-(3-methyl-4-nitrophenyl)-phosphorothioate, and furthermore halogenated hydrocarbons such as H.C.H., chlordane, lindane, toxophene or carbamates, for example, carbaryl.

For the control of insects, red spider mites and development stages thereof on standing crops, a quantity of 3–20 liters per hectare of alkylated benzene of the invention is suitable. For example, a quantity of 15–20 liters per hectare is used for the dodecyl benzene.

The dodecyl benzene or the aqueous emulsions thereof may be sprayed both from airplanes and with the aid of machines on the ground. According to the "low-volume" technique a quantity of 15–20 liters of dodecyl benzene may suffice for aerial spraying when the liquid is not diluted with other agents, or is mixed. Very satisfactory results may alternatively be achieved by aerial spraying with 5–10 liters of dodecyl benzene by dissolving or dispersing a different insecticide or acaricide in the liquid for example, malathion in a ration of, for example, 3 liters of dodecyl benzene in 1–2 liters of malathion.

Aqueous emulsions are alternatively suitable for aerial spraying. For example, a miscible oil of dodecyl benzene which contains approximately 3 percent of emulsifier is diluted with the same quantity of water whereafter the emulsion can be aerially sprayed on the crops in a quantity of 30–40 liters per hectare.

Aqueous emulsions which contain 2 percent of dodecyl benzene may be used in conventional spraying apparatus, which emulsions are prepared by mixing a miscible oil or a flowable paste of the type described hereinbefore with the desired quantity of water.

While we have described our invention in connection with specific embodiments and applications, other modifications thereof will be readily apparent to those skilled in this art without departing from the spirit and scope of the invention as defined in the appended claims.

EXAMPLE 1:

95 gms of "Dobane" PT12 were mixed with 5 gms of a mixture of alkylphenolpolyglycolether and calcium-dodecyl benzene sulphonate and stirred untill complete homogeneity.

This preparation was dispersed in 4,9 ls of water whereafter this emulsion was sprayed on citrus trees infected with spider unites till "run off." The spider mite population was completely controlled and no phytotoxic effects were observed.

EXAMPLE 2:

80 gms of "Dobane" JN(X) were emulsified in 20 gms of an aqueous solution having the following composition:
5 percent polyvinylalcohol
3 percent sodium dodecyl benzene sulphonate
92 percent water. This emulsion is of the mayonaise type and is physically a thick white paste; 2,5 parts per weight of this emulsion were gradually diluted with 97,5 parts per weight of water. This aqueous emulsion was sprayed as a summer spray on apple trees. Complete control of spider mites was achieved without noticeable phytotoxic effects.

EXAMPLE 3:

80 gms of "Dobane" PT12, 5 gms of Ethion (malathion or parathion) and 5 gms of a mixture of alkylphenolpolyglycolether and calcium dodecyl benzene sulphonate were mixed to complete homogeneity and subsequently dispersed in 10 ls of water. This emulsion was sprayed on citrus till "run off". Complete control of spider mite population was achieved and no visible phytotoxicity was observed.

What is claimed is:

1. A method of combatting insects and red spider mites in a plant crop comprising treating said insects and red spider mites with an insecticidally and acaricidally effective amount of dodecylbenzene.

2. The method of claim 1, wherein the dodecyl benzene is employed in the form of an aqueous emulsion wherein a minor amount of an emulsifier is present.

3. The method of claim 2, wherein the aqueous emulsion is sprayed on the crop.

4. The method of claim 2, wherein a non-ionic emulsifier is employed.

5. The method of claim 3, wherein an amount of the emulsion is sprayed on the crop such that from 3–20 liters of the dodecyl benzene is applied per hectare.

6. The method of claim 1, wherein about 15–20 liters of dodecyl benzene are applied per hectare.

7. The method of claim 6, wherein a 2 percent aqueous emulsion of dodecyl benzene is sprayed on the crop.

8. The method of claim 5, wherein about 30–40 liters of the emulsion are employed per hectare.

9. The method of claim 1, wherein the dodecyl benzene is employed in the form of a solution in a non-phytotoxic diluent.

10. The method of claim 9, wherein the diluent is kerosene.

11. The method of claim 1, wherein in addition an organophosphorus or a halogenated hydrocarbon pesticide is employed with the dodecylbenzene.

* * * * *